(12) United States Patent
Boulanger et al.

(10) Patent No.: US 11,906,302 B2
(45) Date of Patent: *Feb. 20, 2024

(54) METHOD AND SYSTEM FOR MEASURING A SURFACE OF AN OBJECT COMPRISING DIFFERENT STRUCTURES USING LOW COHERENCE INTERFEROMETRY

(71) Applicant: UNITY SEMICONDUCTOR, Montbonnot-Saint-Martin (FR)

(72) Inventors: Jean-François Boulanger, Saint-Ismier (FR); Isabelle Bergoënd, Montbonnot-Saint-Martin (FR)

(73) Assignee: UNITY SEMICONDUCTOR, Montbonnot-Saint-Martin (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,151

(22) Filed: Apr. 18, 2023

(65) Prior Publication Data

US 2023/0251079 A1 Aug. 10, 2023

Related U.S. Application Data

(63) Continuation of application No. 17/296,117, filed as application No. PCT/EP2019/082942 on Nov. 28, 2019, now Pat. No. 11,713,960.

(30) Foreign Application Priority Data

Nov. 30, 2018 (FR) ...................................... 1872153

(51) Int. Cl.
*G01B 9/0209* (2022.01)
*G01B 9/02* (2022.01)
*G01B 11/06* (2006.01)

(52) U.S. Cl.
CPC ....... *G01B 9/0209* (2013.01); *G01B 9/02083* (2013.01); *G01B 9/02088* (2013.01); *G01B 11/0625* (2013.01); *G01B 2210/56* (2013.01)

(58) Field of Classification Search
CPC ............ G01B 9/02083; G01B 9/02088; G01B 9/0209; G01B 11/0625; G01B 2210/56
See application file for complete search history.

(56) References Cited

U.S. PATENT DOCUMENTS

| 7,522,288 B2 * | 4/2009 | De Groot ........... G01B 11/2441 356/497 |
| 11,713,960 B2 * | 8/2023 | Boulanger ......... G01B 9/02083 356/479 |

(Continued)

FOREIGN PATENT DOCUMENTS

| EP | 2884338 A1 | 6/2015 |
| WO | 2004079294 A2 | 9/2004 |

(Continued)

OTHER PUBLICATIONS

French Search Report received for Application No. 1872153, dated Aug. 22, 2019.

(Continued)

*Primary Examiner* — Michael A Lyons
(74) *Attorney, Agent, or Firm* — Greer, Burns & Crain, Ltd.

(57) ABSTRACT

A method and related system for measuring a surface of a substrate including at least one structure using low coherence optical interferometry, the method being implemented with a system having an interferometric device, a light source, an imaging sensor, and a processing module, the method including: - acquiring, with the imaging sensor, an interferometric signal formed by the interferometric device between a reference beam and a measurement beam reflected by the surface at a plurality of measurement points (Continued)

in a field of view; the following steps being carried out by the processing module: classifying, by a learning technique, the acquired interferometric signals according to a plurality of classes, each class being associated with a reference interferometric signal representative of a typical structure; and analysing the interferometric signals to derive information on the structure at the measurement points, as a function of the class of each interferometric signal.

14 Claims, 8 Drawing Sheets

(56) References Cited

U.S. PATENT DOCUMENTS

| | | |
|---|---|---|
| 2015/0062590 A1 | 3/2015 | Bagherinia |
| 2015/0305614 A1 | 10/2015 | Narasimha-Iyer et al. |
| 2019/0378012 A1* | 12/2019 | Tripodi .................. G01B 11/02 |

FOREIGN PATENT DOCUMENTS

| | | | |
|---|---|---|---|
| WO | 2005086582 A2 | 9/2005 | |
| WO | 2009012207 A1 | 1/2009 | |
| WO | WO-2017178306 A1 * | 10/2017 | ......... G01B 11/0608 |

OTHER PUBLICATIONS

International Search Report and Written Opinion received for PCT/EP2019/082942, dated Feb. 10, 2020.
Office Action received in Chinese Application No. 201980089648.1, dated Oct. 11, 2022.
Beverage, J.L., et al., "Interferometric microscope with true color imaging," Proc. SPIE 9203, Aug. 2014, 10 pages.
Lee, B., et al., "Profilometry with a coherence scanning microscope," Applied Optics, vol. 29, No. 26, Sep. 10, 1990, pp. 3784-3788.
Li, P., et al., "Multispectral image segmentation by a multichannel watershed-based approach," International Journal of Remote Sensing, 2004, vol. 28, pp. 4429-4452.
Wikipedia, "Pattern recognition," retrieved from the Internet: https://en.wikipedia.org/w/index.php?title=Pattern_recognition&oldid=868091442 on Aug. 21, 2019, 12 pages.

* cited by examiner

METHOD AND SYSTEM FOR MEASURING A SURFACE OF AN OBJECT COMPRISING DIFFERENT STRUCTURES USING LOW COHERENCE INTERFEROMETRY

RELATED APPLICATIONS

This application is a continuation of, and claims priority under 35 U.S.C. 120 from U.S. application Ser. No. 17/296,117, filed May 21, 2021, which claims the benefit of International Patent Application No. PCT/EP2019/082942 filed on Nov. 28, 2019, and which claims the benefit of French Application No. 1872153, filed Nov. 30, 2018, all of which are incorporated by reference.

BACKGROUND

The present invention relates to a method for measuring the surface of an object comprising different structures using low coherence interferometry.

The field of the invention comprises, non-limitatively, that of measurement and control devices for the microelectronics or integrated optics industry.

Optical profilometry conventionally makes it possible to determine the profile or the topography of a face or of a surface of an object. In the case of optical profilometry using low coherence interferometry, a broad-spectrum light source is used. By varying the optical paths of the reference or inspection rays, an interference signal (interferogram) is obtained. This is an intensity signal that is a function of the difference between the paths travelled by the rays.

The wave reflected on, or emergent from, the surface of the object to be measured undergoes a phase shift which depends on the physical characteristics of the materials present which are passed through by the wave and/or on which it reflects. These characteristics are the complex refractive indices and/or the thicknesses of the stacks of layers of the transparent materials within the wavelength range of the light source. This phase shifting on reflection adds to the phase shifting due to the topography.

When the patterns or structures present on the surface of the object analysed are produced with different materials or stacks of different materials, or transparent multilayer stacks, the phase shifting on reflection is then different for each of these structures.

As a result, the relative height obtained based on interference signals for different structures may be incorrect. Similarly, in some cases, the calculated values for thicknesses of layers of patterns or structures may be incorrect.

It is known to calculate theoretical phases on reflection by utilizing the items of information held on the structures, and in particular the materials, or the stacks of layers of materials, present. In this way theoretical reflectance models are constructed that are used for correcting the measurements.

It is also known to calculate theoretical reflectance models for stacks of materials known beforehand and to apply methods of adjustment of these models to signals originating from the interferograms in order to derive therefrom measurements of thicknesses of thin layers (less than one micrometre).

In order to correct topographical measurements and/or to evaluate thicknesses of layers based on theoretical models, it is necessary however to know or to identify the different structures of materials present in the field of view so as to be able to apply the appropriate model. This can be problematic for surfaces comprising multiple structures. In fact, generally, the nature of the structures present in the field of view and their spatial distribution (layout) is unknown.

Further, the document *"Interferometric microscope with true color imaging"*, by J. L. Beverage et al., Proc. SPIE 9203, August 2014 is known, which describes a method based on generating colour images in addition to acquiring interferometric signals in interferometric microscopes in order to visualize the presence of different materials in the field of view based on their spectral reflectance, analysed for example on three wavelengths (red, green and blue). However, this method requires several acquisitions (one per colour) and modifications of the interferometric system with the addition or modification of the light sources, filters or detection systems, thus rendering this approach very complex and costly in terms of measuring time and equipment. In addition, in general there is a limitation to the use of three fixed wavelengths, which are not necessarily the most discriminating with respect to the reflectance of the different stacks of materials of the object measured.

The objective of the invention is to solve the above-described problems.

SUMMARY

A purpose of the present invention is to propose a method and a system for measuring the surface of an object that may comprise at least two different structures that are simple to implement and in particular do not require the use of several coloured lights or sensors.

Another purpose of the present invention is to propose a method and a system for measuring the surface of an object that may comprise at least two different structures making it possible to obtain measurements of profiles of the surface of an object that are corrected from the effects due to the materials or to the structures present on the surface of this object.

Yet another purpose of the present invention is to propose a method and a system for measuring the surface of an object that may comprise at least two different structures making it possible to obtain measurements of thicknesses of transparent layers present on the surface of the object.

A further purpose of the present invention is to propose a method and a system for measuring the surface of an object that may comprise at least two different structures making it possible to detect and characterize these structures with current measurement apparatus with very little or no modification of their current architecture.

At least one of these purposes is attained with a method for measuring a surface of an object comprising at least one structure using low coherence optical interferometry, the method comprising the following steps:
  acquiring an interferometric signal at a plurality of points, called measurement points, of said surface in a field of view;
  for at least one measurement point:
    attributing the acquired interferometric signal to a class of interferometric signals from a plurality of classes, each class being associated with a reference interferometric signal representative of a typical structure; and
    analysing the interferometric signal in order to derive therefrom an item of information on the structure at the measurement point, as a function of its class.

The object can be or comprise in particular a substrate for the microelectronics or integrated optics industry under the forms thereof, such as a wafer of semi-conductive material or of any other material (glass), a substrate on film (dicing frame), a substrate with integrated circuits and interconnections (electrical interconnects), etc.

In the present document, the term "structure" denotes any arrangement capable of being located at the surface of the object, such as tracks, layers of materials or stacks of layers of dielectric or conductive materials, optical or electronic components, etc. A structure can thus be formed from at least one layer of material.

An object can thus comprise at least two, or a plurality of different structures distributed on its surface.

The interferometric signals can be obtained by a profilometry system. These interferometric signals can contain the items of information relating to an altitude or a height at different points of the surface to be measured. They can also contain items of information relating to the nature of the surface itself (materials, thicknesses of layers, etc.).

The step of attributing the acquired interferometric signals to classes of interferometric signals, proposed by the method according to the invention, thus makes it possible to classify the interferometric signals individually according to the type of structure from which each signal was obtained. The type of structure (for example a simple transparent layer or a stack of thin layers of transparent materials) is represented by a typical structure with an associated reference interferometric signal.

The attribution step corresponds to a segmentation of the field of view measured on the surface of the object. The method according to the invention thus makes it possible to achieve a segmentation of the image of the surface of the object to be measured.

Once attributed to a class, each interferometric signal is analysed according to a model, or a profilometric model, corresponding or pertaining to its class. A class can be defined, for example, by a reflectance model, this reflectance model taking account of the material(s) and the geometry (thicknesses of the layers) of the structure.

Thus, using the method according to the invention, it is possible to obtain an item of information on the distribution of different structures on the surface of an object, by utilizing an interferometric signal measured by low coherence optical interferometry, without the need for accurate knowledge of the topology or of the location of these structures.

The method according to the invention also makes it possible to obtain measurements of profiles or of shape of the surface of the object, corrected from the effects (in particular of phase) due to the materials and/or to the structures present, and/or measurements of thicknesses of layers, without having accurate prior knowledge of the topology of these materials and/or of the structures on the surface of the object.

Moreover, the attribution step can be carried out by digital or analogue processing, and has little or no impact on the steps of measurements of the interferometric signals. As a result, the method according to the invention can be implemented by the current measurement devices, with very little or no architectural modification, in particular of the detection part of these devices.

According to an embodiment, the step of attributing the interferometric signal to a class can comprise a step of initialization of classes.

This step of initialization of classes can comprise supplying at least one of the following elements:
  a list of classes;
  a prior estimation of a number of classes present in the field of view.

This initialization step can result in a set of classes capable of being represented by interferometric signals measured in the field of view. It thus makes it possible to have available a set of classes corresponding, or capable of corresponding, to the structures actually present in the field of view. This initialization step can also result in a number of classes defined beforehand, allowing a distribution of the interferometric signals in this number of classes.

Advantageously, supplying a list of classes can comprise at least one of the following steps:
  determining classes based on measurements of interferometric signals on a reference surface (of the same object or of another object) having known structures;
  determining classes based on prior knowledge (such as masks, drawings or descriptions) of the structures present on the surface of the object.

Thus a list of classes, capable of being present on the object to be measured with their associated reference interferometric signals, is available. A list of classes thus supplied is robust and makes it possible subsequently to use simple classification methods.

This list of classes can be, for example, obtained based on masks, drawings (layout) or descriptions of the structures present on the object, when these items of information are available. It is then possible to derive theoretical reference interference signals by calculation, and thus determine a reference interferometric signal for each class.

The list of classes can also be obtained experimentally, based on, for example, measurements performed on a reference object with known structures.

Alternatively or in addition, the step of initialization of classes can comprise, or be carried out by, the following steps:
  distributing the acquired interferometric signals according to homogenous regions of the field of view, where the regions are homogenous according to a predefined criterion;
  determining classes based on the interferometric signals in said homogenous regions.

The initialization step according to this embodiment can also be described as "preliminary segmentation". In fact it carries out a first segmentation of the field of view in homogenous regions (according to the predefined criterion), which can be used to render the step of initialization of the classes more robust and more accurate in terms of choice or of construction of classes, and improve the pixel-by-pixel classification of the interferometric signals. The classes thus determined can be obtained directly based on interferometric signals in the homogenous areas, for example based on averages or other statistical parameters. The interferometric signals in the homogenous areas can also be used to identify classes from a predefined list of classes.

The homogenous regions can in particular be determined by utilizing a property of the interferometric signals, such as an intensity, a reflectance or a spectral reflectance of these interferometric signals. The predefined criterion can be for example linked to maximum admissible variations of intensity or reflectance.

Advantageously, the step of attributing the interferometric signal to a class can comprise, or be carried out by, comparing the acquired interferometric signal with the reference interferometric signal.

Preferably, this comparison can comprise, or be carried out by, determining a distance, (such as a Euclidean distance) between the acquired interferometric signal and the reference interferometric signal.

Alternatively or in addition, the step of attributing the interferometric signal to a class can comprise, or be carried out by, an iteration of the following steps:
  associating the interferometric signal with a class;
  for each class, determining a fresh reference interferometric signal based on the interferometric signals attributed to this class. The iteration is continued until a predetermined convergence criterion is satisfied.

Thus, by performing an iteration of the steps of associating the interferometric signal with a class and determining a fresh reference signal for this class, the accuracy of the identification of the classes for each interferometric signal can be improved. Moreover, the classes can be initialized based on the interferometric signals themselves, in particular in the case where the initialization step only supplies a number of classes.

To this end, each class, or more particularly the reference interferometric signal, is determined by utilizing the interferometric signals attributed to this class. A fresh reference interferometric signal can, for example, be calculated based on the average of the interferometric signals attributed to this class, and optionally from the preceding reference interference signal. The iterations are continued until a predetermined convergence criterion is satisfied. The convergence criterion can comprise, for example, a measurement of variation or of distance between interferometric signals originating from successive iterations. It can also be based on the fact that between 2 iterations, no further measurement point changes class.

Advantageously, the step of analysing the interferometric signal can comprise an identification of a structure or of a property of a structure as a function of the class of the interferometric signal. This identification can in particular be carried out based on the determination of the optical spectral density of the interferometric signal, or of its spectral reflectance.

In fact, using the optical spectral density or the spectral reflectance makes it possible to differentiate structures or materials present on the surface of the object, even when using an intensity or imaging sensor producing interferograms in greyscale.

In the knowledge of the class to which each interferometric signal was attributed, it is thus possible to attribute the interferometric signals or to make them correspond to a type of structure and/or material that represents their class.

It is thus possible to determine accurately the geometry of the object, i.e. the distribution of the different structures on the surface of the object.

Advantageously, the step of analysing the interferometric signal can comprise determining the thickness of one or more transparent layers by applying a spectral reflectance model depending on the class of the interferometric signal.

It is thus possible to implement known reflectometry techniques by adjusting the model for measuring thin layer thicknesses. Attributing the interferometric signal to a class makes it possible to choose the correct model.

Advantageously, the step of analysing the interferometric signal can comprise determining the height of the surface at the measurement point by taking account of a phase shift factor of said interferometric signal depending on its class.

This phase shift factor makes it possible to correct the phase shift on reflection due, for example, to absorption losses or reflections within the layers of material.

Advantageously, the acquisition step can be carried out by measuring an interferometric signal for each pixel of a sensor performing a full-field measurement, where each pixel of the field of view of the sensor corresponds to a measurement point.

Advantageously, the method according to the invention can be implemented with an object of the semiconductor substrate type.

According to another aspect of the same invention, there is proposed a system for measuring using low coherence optical interferometry, for measuring a surface of an object comprising at least one structure, the system comprising:
  a device for acquiring an interferometric signal at a plurality of points, called measurement points, of said surface in a field of view, and
  a module for processing the acquired interferometric signals, configured in order to:
    attribute each acquired interferometric signal to a class of interferometric signals from a plurality of classes, each class being associated with a reference interferometric signal representing a (particular) structure; and
    carry out an analysis of the interferometric signal in order to derive therefrom an item of information on the structure at the measurement point, as a function of its class.

The profilometry system produces interferometric measurements that utilize the differences of optical path (or propagation time) between a reference beam and a measurement beam reflected by the surface to be measured. By varying the optical path difference over time, an interferometric signal in the temporal domain is obtained.

Alternatively, other interferometric measurement systems can be used, for example making it possible to obtain interferometric signals in the spectral domain, directly as a function of the wavelengths used. Such systems can implement, for example, an interferometer lit by a broad-spectrum light source, with a detection device allowing a spectral analysis of the interferometric signal, such as a spectrometer placed before the photodetectors. It is also possible to use wavelength-adjustable light sources.

In an advantageous version, the device for acquiring an interferometric signal can comprise a full-field interferometric sensor.

In this case, a measurement point can correspond to a pixel of the field of view of said sensor. Such an array sensor can be, for example, a charge-coupled device (CCD) or complementary metal oxide semiconductor (CMOS) camera.

The method and the system according to the invention can each be used for measuring a surface of a semiconductor substrate or of a transparent substrate in the visible spectrum in all possible forms (wafer, wafer on frame, panel, etc.). The surface to be measured can comprise different types of structures such as layers of dielectric or conductive materials, and optical or electronic components. In particular, the method and the system according to the invention can each be used for measuring their corrected profiles and the topology of the structures and/or materials present on the surface, or also for imaging said surface. A profile corresponds to the relative height, or to the height with respect to a reference, of a set of points of the surface. Measuring the profile also makes it possible to report the roughness of the surface of the object.

More generally, the method and the system according to the invention can each be used for measuring a surface of an object, in particular for the characterization and/or the imaging of at least one pattern of said surface.

BRIEF DESCRIPTION OF THE DRAWINGS

Other advantages and characteristics will become apparent on examination of the detailed description of examples that are in no way limitative, and from the attached drawings, in which.

DETAILED DESCRIPTION

It is well understood that the embodiments that will be described hereinafter are in no way limitative. Variants of the invention can in particular be envisaged comprising only a selection of characteristics described hereinafter in isolation from the other characteristics described, if this selection of characteristics is sufficient to confer a technical advantage or to differentiate the invention with respect to the state of the prior art. This selection comprises at least one, preferably functional, characteristic without structural detail, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures keep the same reference.

Figure 1:
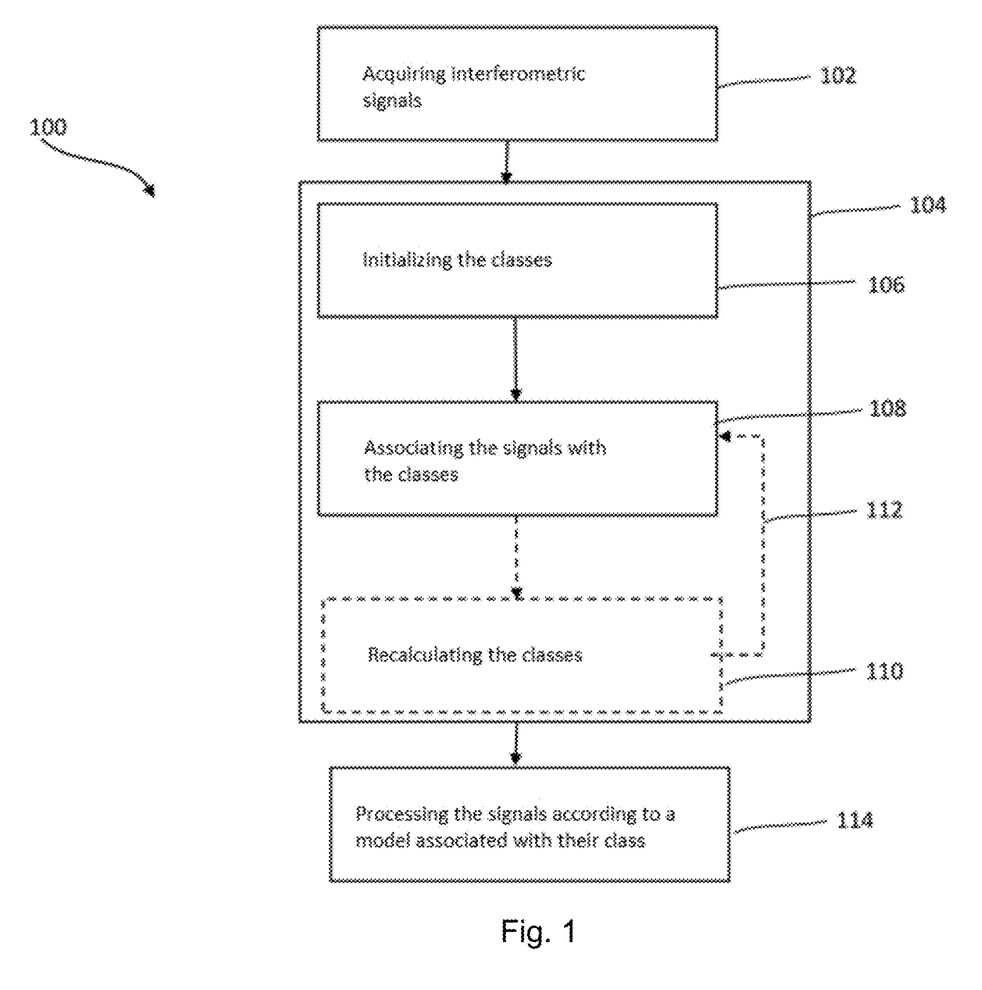
FIG. 1 is a diagrammatic representation of a non-limitative embodiment example of a method according to the invention.

FIG. 1 is a diagrammatic representation of a non-limitative embodiment example of a method according to the invention.

The method 100 comprises a step 102 of acquiring an interferometric signal at a plurality of measurement points on a surface of an object, for example using a full-field interferometric sensor as detailed hereinafter. In this case, each pixel of the sensor corresponds to a measurement point, and an interferometric signal is measured for each pixel in the field of view of the sensor.

An example of the acquisition of the interferometric signals will be described in greater detail with reference to FIG. 3 below.

The method 100 also comprises a step 104 of attributing each interferometric signal measured to a class from a set of classes. Each class is represented by a reference interferometric signal.

In certain embodiments, these classes of reference interferometric signals correspond, or are associated with, particular structures or types of structures capable of being present on the surface of the object to be measured. The reference interferometric signals can then be chosen so as to be representative of particular interferometric signals acquired on different types of structures such as:
    structures of particular materials (silicon dioxide, silicon, etc.), transparent or opaque (metal, etc.); and/or
    structures constituted by transparent materials, or stacks of transparent materials, according to particular thicknesses or thickness ranges.

The set of classes is constructed or initialized during a step 106 of initialization of classes.

Generally, the initialization makes it possible to define and/or to select appropriate classes, i.e. classes that are representative of the types of structures actually present in the field of view of the sensor.

A list of classes can be available, capable of being present on the surface of the object to be measured with their reference interferometric signals, this list capable of being obtained based on masks, drawings (layout) or descriptions of the structures present on the object.

Classes can also be obtained experimentally, based on, for example, measurements performed on a reference object with known structures.

According to another variant, it is possible to simply define a number of classes beforehand, and to use a classification algorithm. such as the known K-mean algorithm, to generate the classes based on the set of interferometric signals measured. However, this method can have the drawback of generating sub-optimal classes.

Of course, all these variants can be combined, with classes defined theoretically, and/or defined experimentally, and/or defined by number.

According to an embodiment, the step of initialization 106 of the method 100 according to the invention can comprise a step of preliminary segmentation. This preliminary segmentation step can be carried out by grouping together the measured interferometric signals, in the field of view, in regions considered to be homogenous according to a criterion. This criterion can be, for example, a reflectance value, global or at particular wavelengths. A homogenous region is then considered to correspond to a class, or in other words comprises only interferometric measurements belonging to one and the same class. Thus, it is possible to determine a single class for a homogenous region, and therefore attribute the set of interferometric signals of this homogenous region to this class. The preliminary segmentation thus makes it possible to select or identify more efficiently the classes that are in fact present and suitable for performing the pixel-by-pixel classification of the following step. In fact, the pixel-by-pixel classification can allow a more accurate classification on fine patterns (structures at the scale of a few pixels).

According to a first example, it is possible to retain only those classes that it has been possible to associate with the homogenous regions as defined by the preliminary segmentation, chosen for example from a set of predefined classes. It is also possible to revise the reference interferometric signals of the selected classes by using the data originating from the measurements, for example replacing the reference interferometric signal of a class with the average signal calculated over the set of homogenous regions associated with this class.

According to a second example, it is possible to define the classes directly based on interference signals obtained, for example on average, over homogenous areas.

The applicable preliminary segmentation methods can comprise, for example:
- methods based on a detection of the contours, of the watershed type for example, these methods directed to using the contours or the gradients in the image for delimiting the different regions;
- segmentation methods based on a detection of the regions, by using Markov fields for example, these methods directed to separating the field of view into different homogenous regions.

An example of this preliminary segmentation step will be detailed below.

During a step 108 of the method 100, the measured interferometric signals I(x,y) are associated or attributed, per pixel, to the classes constructed beforehand.

Generally, this association step 108 implements a comparison between each interferometric signal, at each point measured, and the reference interferometric signal of each class. The interferometric signals are respectively attributed to the class for which the best similarity or the best proximity to the reference interferometric signal has been found.

The comparison of the interferometric signals per pixel with the reference interferometric signals can be carried out by performing distance calculations such as Euclidean distance calculations, or any other distance or any other measure demonstrating a difference between two signals.

Preferably, the comparison can be performed in particular by using the spectral reflectance of the interferometric signals, obtained by Fourier transform of the measured temporal interferometric signals.

Of course, other comparison methods can be implemented, which utilize items of temporal information, shape or phase of the interferometric signals.

Figure 2:
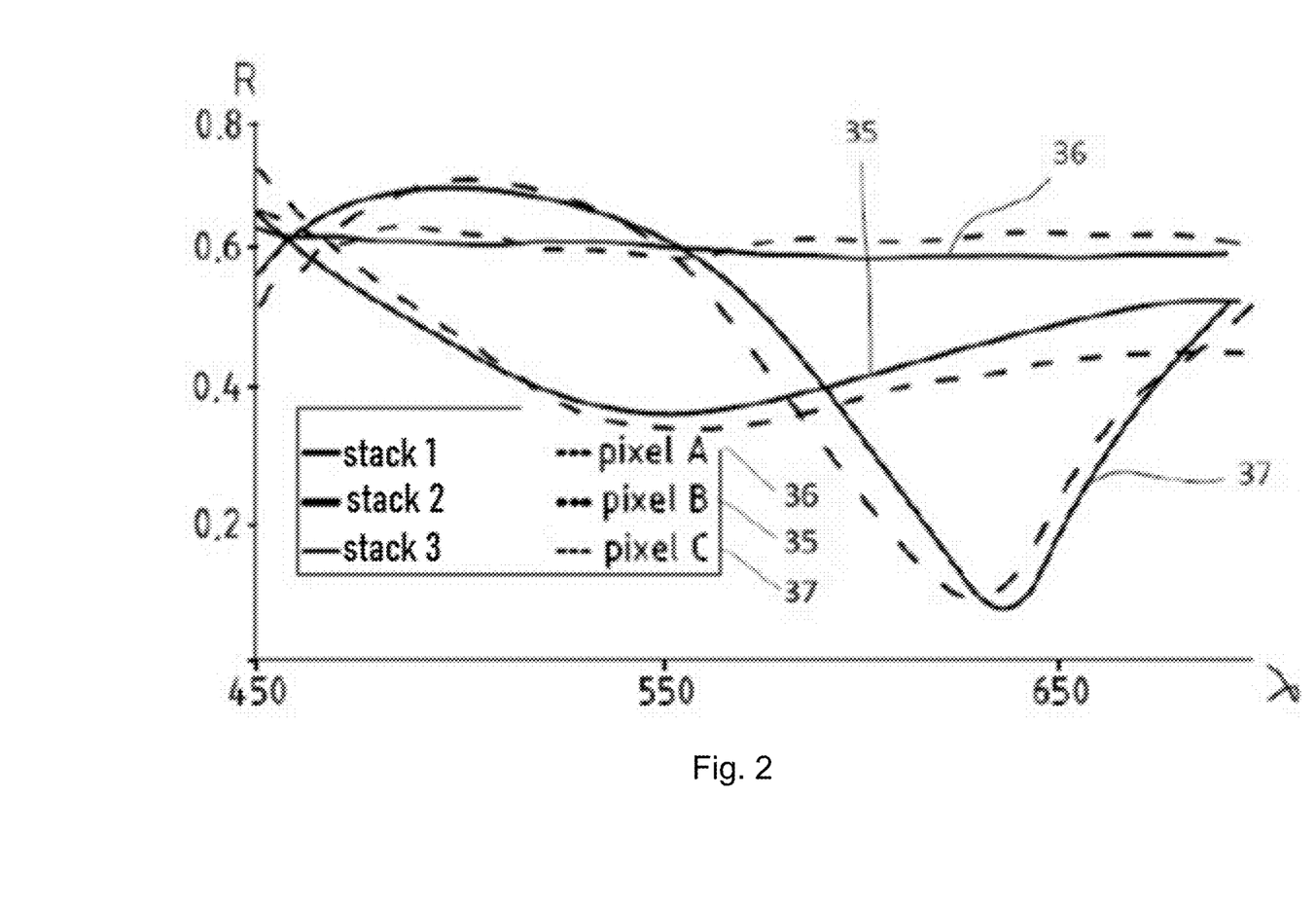
FIG. 2 is a diagrammatic representation of an embodiment example of the method in FIG. 1.

FIG. 2 shows an example of attribution of interferometric signals to predefined classes, by using spectral reflectances. Spectral reflectances corresponding to the reference interferometric signals representative of three classes are shown with solid lines. Spectral reflectances corresponding to the interferometric signals measured at three measurement points or pixels on the image, and attributed respectively to these classes, are shown with dotted lines. Each measured signal—reference signal pair 35, 36, 37 thus represents a different type of structure.

Different classification algorithms can be implemented for attributing the interferometric signals to the classes.

According to embodiments, the signals are attributed to the classes by using learning techniques.

According to a first example, such a learning technique implements support vector machines (SVM) that require a set of learning classes. This set can be supplied, for example, in step 106 of initialization of the method 100, and in particular by theoretical or experimental knowledge of the characteristics of certain interferometric signals expected, or measured on the surface of the object.

According to a second example, a learning technique involves neural networks. The learning data (corresponding to the reference interferometric signals) can thus be predefined theoretically or experimentally or be derived during training by accepting or rejecting some of them.

According to further embodiments, simple "closest near neighbour" classification methods can be used. For any pixel of the field of view of the sensor, its interferometric signal or the corresponding reflectance spectrum is compared to all the reference interferometric signals or to the corresponding reference reflectance spectra. This comparison can be performed, for example, by using a Euclidean distance. The interferometric signal of the pixel is then attributed to the "closest" class, or in other words, the class for which the distance thus determined is minimal. This method is suitable in particular for classifying pixels into a set of predefined classes.

According to yet further embodiments, methods based on a classification operation can also be used, for example the aforementioned K-mean method. The measurement points associated with the image pixels are thus divided into K groups or classes originating, for example, from the step 106 of initialization of the method 100 according to the invention.

For the K-mean algorithm, the classes can originate in particular from an item of prior information, which can be the expected number of classes (K value). Alternatively, the algorithm can also be initialized with a set of classes originating from full or approximate knowledge of the characteristics of the interference signals or spectral reflectance signals of reference associated with the measured or theoretical structures present on the surface of the object. This makes it possible to initialize the algorithm with greater accuracy and to minimize the classification errors.

The attribution or association step 108 can then be carried out by minimizing a distance function that can be the sum of the squares of the distances between the spectral reflectance signals of each pixel with respect to the reference spectral reflectances of the class to which the pixel is attributed. These reference signals correspond to the average signals in each class.

An example of application of the K-mean technique will be described below.

Advantageously, the method 100 according to the invention can also comprise a step 110 of determining, for each class with which interferometric signals have been associated, a fresh reference interferometric signal based on the interferometric signals attributed to this class. A fresh set of classes is thus formed. The fresh reference interferometric signals (or the corresponding spectral reflectances) can, for example, be calculated based on the average of the interferometric signals attributed to the class in question, and optionally, from the initial reference interference signal. Then, the measured interferometric signals are again attributed to the fresh classes (step 112 in FIG. 1). The iterations are continued until, for example, a predetermined convergence criterion is satisfied. This convergence criterion can, for example, take account of the displacement of the centres of classes: convergence is attained from the moment at which the centres do not move (or less than a certain value). This convergence criterion can also take account of the fact that convergence is attained when no further pixel (or a number of pixels less than a value) changes class from one iteration to another.

The iteration of the steps of attribution 108 and determination 110 of a fresh reference signal is particularly suitable for classification according to the K-mean method, as the classes can be improved iteratively based on the measurements.

The step of attribution 104 of the interferometric signals to classes finishes after the classification of all the signals.

With reference to FIG. 1, the method 100 according to the invention also comprises a step 114 of processing or analysis of the interferometric signals associated with the different measurement points. Advantageously, this processing step 114 is carried out according to methods pertaining to the classes with which they are associated.

The method of the invention thus in particular makes it possible to apply specific analyses, or specific processing, to the interferometric signals of the different pixels, as a function of the class to which they belong or of the corresponding structure. It is thus possible, for example, to perform:
- a differentiated statistical calculation, for example of roughness, as a function of the different structures identified;
- a calculation of a mapping of estimated thickness of transparent materials, for example by applying a reflectometry algorithm;
  - measurements of corrected topography profiles, in particular independently of the contributions of the physical characteristics of the materials, such as their complex refractive indices and the thicknesses for the layer stacks in the case of transparent materials. It is possible in particular, in order to obtain items of corrected height information, to apply:
- a simple phase shift factor, for example as for the case of a metallic layer;
- a layer stack reflectance model, in order to obtain an estimation of the thickness of a transparent layer.

Hereinafter, an example embodiment of the method according to the invention will be described in detail.

Figure 3:
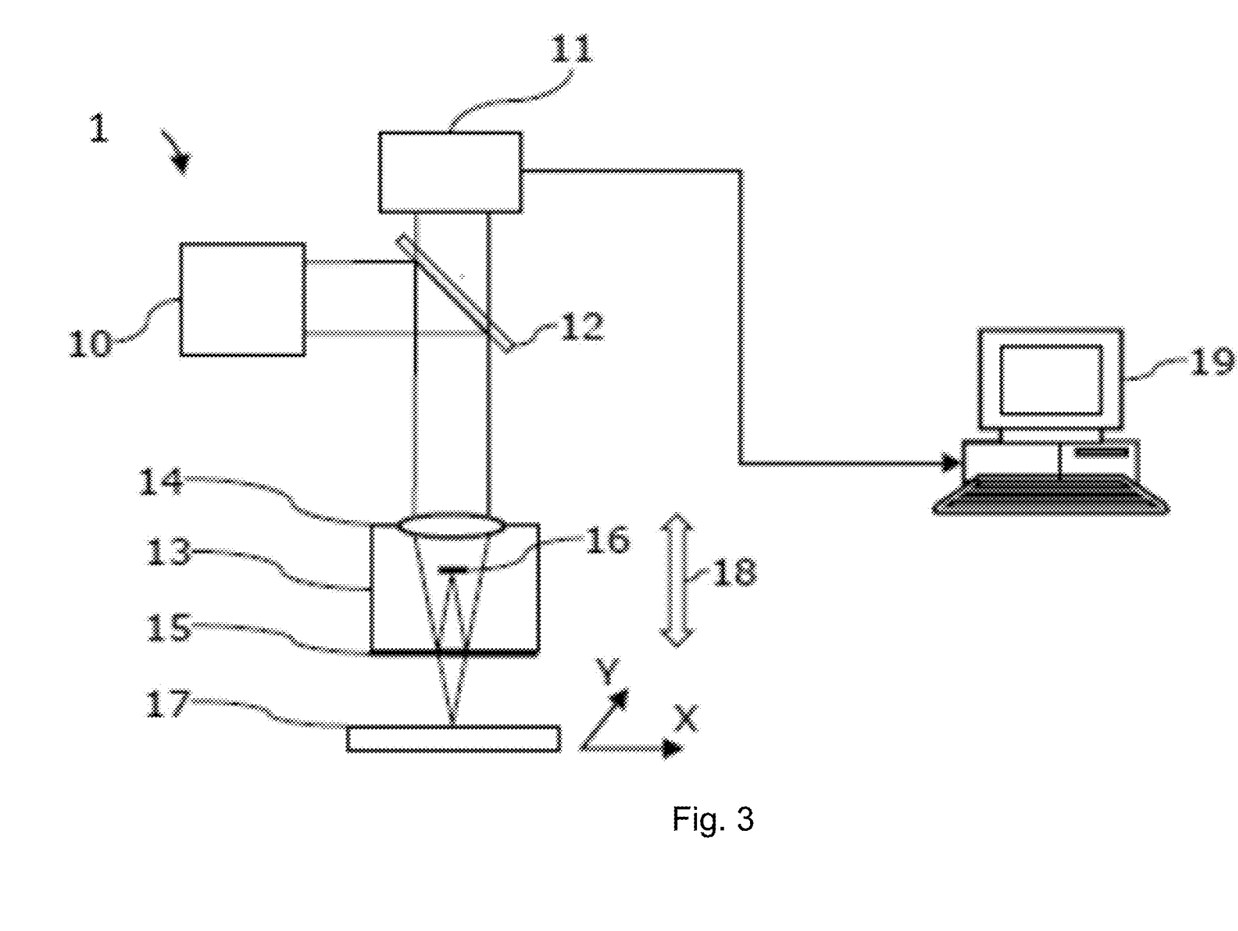
FIG. 3 is a diagrammatic representation of a non-limitative embodiment example of a system according to the invention.

With reference to FIG. 3, an example profilometric system or optical profilometer implemented according to the invention is described.

This profilometric system or optical profilometer 1 comprises an interferometric device 13 which can be of the Michelson, Mirau or other type. In the embodiment presented, this interferometric device 13 is shown in the form of an interferometric objective 13 of the Mirau type with a lens or an imaging optics 14, a semi-reflective beam splitter 15 and a reference mirror 16. The optical profilometer 100 also comprises a lighting system 10 which emits a broad-spectrum light and which can include, for example, a light-emitting diode (LED) or a halogen lamp, and an image sensor or a camera 11 with for example an image sensor array of the CCD or CMOS type. The optical profilometer 1 also comprises a scanning device 18 actuated, for example, by a piezoelectric actuator that makes it possible to vary the optical paths in the two arms of the interferometer relatively, between the beam splitter 15 and the surface of the object to be measured 17 and the reference mirror 16, respectively. Finally, the optical profilometer comprises a processing module 19 of images or interferometric signals, arranged in order to implement the method for processing the measurements according to the invention.

Figure 4:
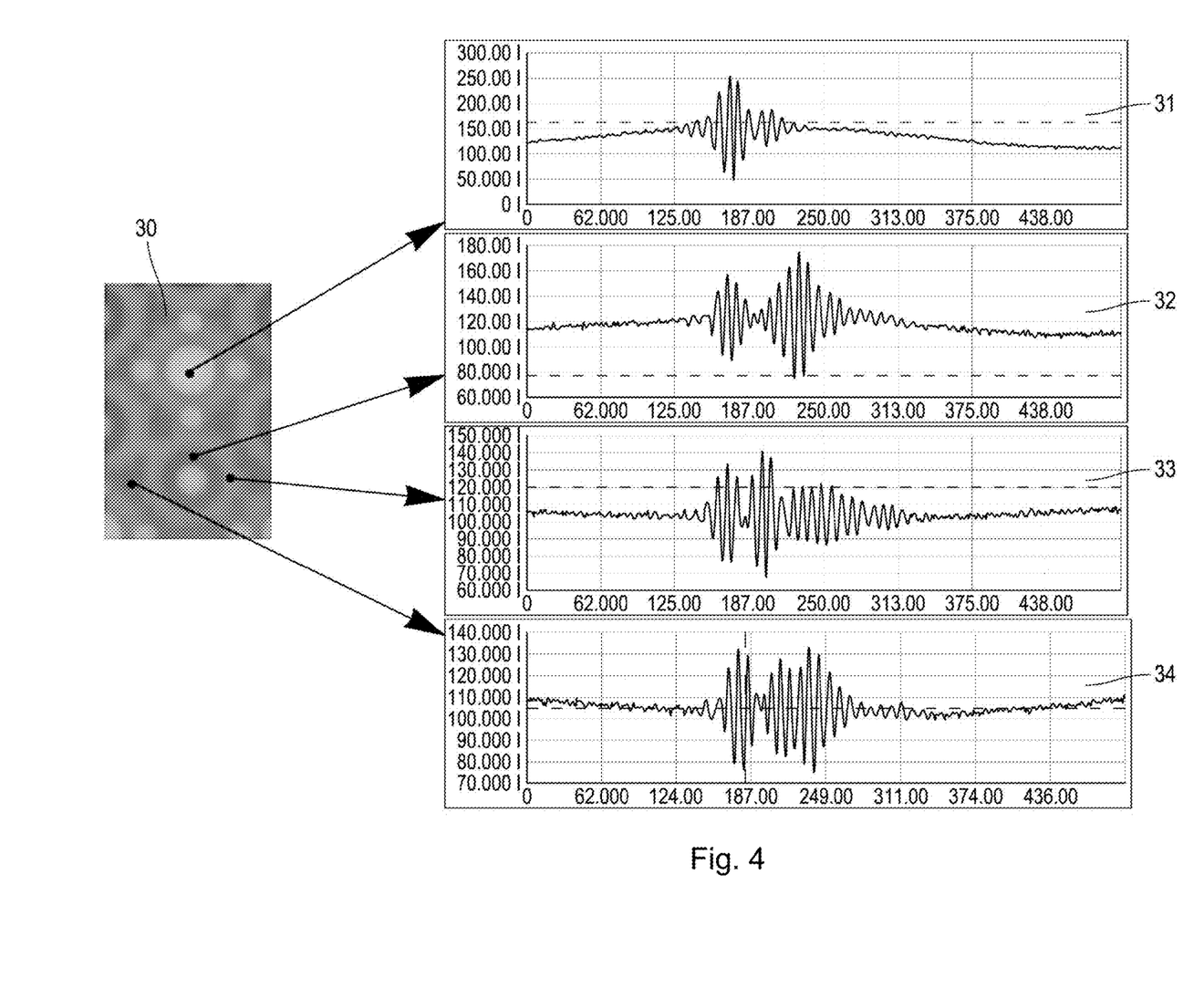
FIG. 4 is a diagrammatic representation of an embodiment example of the method in FIG. 1.

FIG. 4 shows an intensity image 30 of a field of view of a semiconductor substrate on which structures constituted by stacks of different materials have been produced. FIG. 4 also shows examples of interferometric signals 31, 32, 33, 34 corresponding to different types of structures.

It can be observed that the different separate areas on the intensity image generate significantly different interference signals 31-34. These signals acquired at the different points of the image 30 in the field of view can be identified and utilized according to the method 100 of the invention, so as to be able to process them in a differentiated manner as a function of the nature of the structures present in this field of view.

In the embodiment described, the interference signals are analysed and classified by utilizing their spectral reflectance.

A white-light (or polychromatic) interference signal can be broken down into a collection of interference signals in monochrome lighting. This breakdown of the interference signal can be done as a function of the wave number K, with K=2ω/λ, λ being the wavelength.

In a case for which the contribution linked to the angle of incidence is negligible (paraxial approximation), the interference signal at a given pixel can be modelled by the following equation:

$$I(\xi)=\int_0^\infty g(k,\xi)V(k)dk \qquad [\text{Math. 1}]$$

I is the luminous intensity measured on the given pixel at the displacement pitch ξ of the scanning device 18, V(k) is the distribution of the light source spectrum, and g(k,ξ) can be expressed as:

$$g(k,\xi)=R(k)+Z(k)+2\sqrt{R(k)\cdot Z(k)}\cdot\cos[k(h-\xi)+\gamma(k)] \qquad [\text{Math. 2}]$$

Z corresponds to the effective reflectance of the object to be measured 17. This term includes the spectral reflectance of the object at the given pixel and the transmittance of the measurement system comprising the beam splitter 15 (or the separator cube).

This can be expressed as:

$$\sqrt{Z(k)}=\sqrt{T(k)\cdot\rho(k)} \qquad [\text{Math. 3}]$$

T represents the transmittance of the measurement system, comprising the beam splitter 15, and ρ the spectral reflectance of the object to be measured 17.

The effective reflectance of reference, denoted R, includes the reflectances or transmittances of the optical elements of the system 1, such as the reflectance of the reference mirror 16 and the transmittance of the beam splitter 15. The parameter h represents the height of the object and the parameter γ is a term of phase shift of the light wave at reflection on the object and through the measurement system.

FIG. 4 shows examples of measured interference signals or interferograms I(ξ) indicated by the signs 31-34.

For increased clarity of notation, no mention has been made to this point, or will be made in the remainder of the document, of the dependency of the terms V, R, Z, h and γ on the location (x,y) in the image (or in the conjugate plane by the optical system imaging the object). This is nevertheless non-negligible.

The amplitude of the sine curves forming interference signals in monochromatic light is proportional to:

$$V(k)\sqrt{R(k)Z(k)} \qquad [\text{Math. 4}]$$

It is the expression of the modulus of the Fourier transform of the interferogram corresponding to the optical spectral density P(k).

A step of calculating the Fourier transform of the interferogram makes it possible to obtain a measurement of the optical spectral density of the light reflected by the object, via the Fourier transform modulus. The spectral density makes it possible to obtain an item of information on the spectral reflectance ρ(k) of the object.

The field of view of the system 1 or interferometric microscope as shown in FIG. 3 is broken down into sub-regions, in general defined by the pixels of the detection camera 11. An interferogram, or interferometric signal, is thus acquired for each pixel.

According to a variant, it is also possible to consider the phase of the Fourier transform of the interferogram, which makes it possible to obtain the complex reflectance of the stack of materials.

In the remainder of the document, only the use of the Fourier transform modulus of the interferogram corresponding to the optical spectral density P(k) will be described, which is in no way limitative.

As the variable of interest is the spectral reflectance ρ(k), it can be useful to normalize the optical spectral density ρ(k)

so as to improve the subsequent classifications and/or calculations of the thicknesses and/or topographies.

A step of normalization of the Fourier transform modulus of the interferogram (and therefore of the optical spectral density) makes it possible to derive therefrom a spectral reflectance at any point (x,y) of the field of view.

To this end, several strategies can be envisaged, in particular a normalization based on a reference signal, or an auto normalization, which will be described hereinafter.

The principle of normalization based on a reference signal consists of carrying out an acquisition of an interferometric signal on a known reference object or sample covered or constituted by a homogenous material. This reference sample can be, for example, a silicon plate. The modulus of the Fourier transform on this reference sample is calculated from the acquired signal at each point of the image, which supplies a reference optical spectral density.

It is then possible to determine the spectral reflectance values ρ(k) at each pixel of the image, by calculating the ratio between the optical spectral density on the object to be measured and the reference optical spectral density. Of course, the ρ(k) values are only calculated in the spectral band of the lighting system 10, for non-zero optical spectral density reference values.

This approach requires calibration of the measurement system 1 on a known reference object (or even periodic recalibration of the system). The quality of the normalization depends greatly on the regularity of displacement of the scanning device 18 along its stroke and on the stability of the lighting from one acquisition to another.

According to a variant, the reference optical spectral density can be a global or average value calculated over the entire surface of the reference sample if the optical characteristics of the measurement system are sufficiently homogenous.

According to the principle of auto normalization, it is assumed as an approximation that most of the variables are not dependent on their position on the image (homogenous lighting, no spatial variation of the properties of the reference mirror 16 and of the beam splitter 15). Only the spectral reflectance values ρ(k) are considered as being capable of varying according to the location on the image as a function of the patterns of the object. The average modulus of the Fourier transform on the image is calculated in order to thus obtain an expression of the reference optical spectral density. The ratio is then produced at each pixel of the Fourier transform modulus to the mean spectrum (or the optical spectral density to the reference optical spectral density).

The auto normalization approach has the advantage of not requiring any prior calibration step. However, a pseudo-reflectance map is then obtained as the ratio between the reflectance of the given pixel at each wave number and the average of the reflectances at this wave number.

Figure 5:
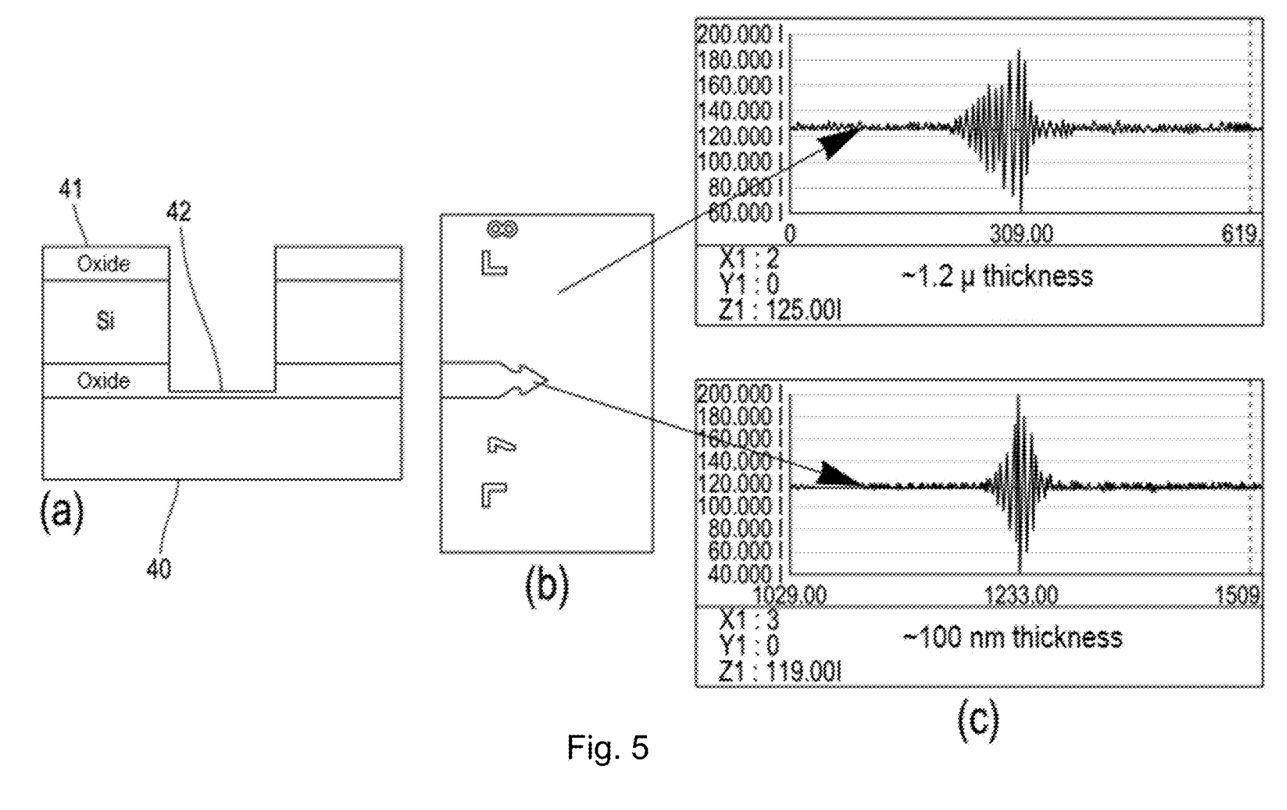
FIG. 5 is a diagrammatic representation of an embodiment example of the method in FIG. 1.

Another measurement example is shown in FIG. 5. The thicknesses of the layers of the structures 41, 42 of an object 40 shown in FIG. 5a must be determined. It is known that the structures to be measured are formed by layers of oxide of different thicknesses and deposited on silicon. An accurate value of the thicknesses of the layers of oxide for each point of a measurement image of the object 40 must be determined.

Measured interference signals associated with a pixel located in each of the two regions, shown in FIG. 5b, and defined by the structures, are shown in FIG. 5c.

On the basis of measurements of interference signals on a reference object (for example identical to the one shown in FIG. 7a), or of prior theoretical knowledge, the expected stacks on the surface of the object are defined. In the case of the example in FIG. 5, the theoretical or expected thicknesses are respectively 1.2 µm silicon dioxide ($SiO_2$) on a substrate of silicon (Si) on the one hand and 0.1 µm $SiO_2$ on a substrate of Si on the other hand.

It is thus possible to calculate theoretical or reference spectral reflectances in order to generate classes of interferometric signals as described above.

Figure 6:
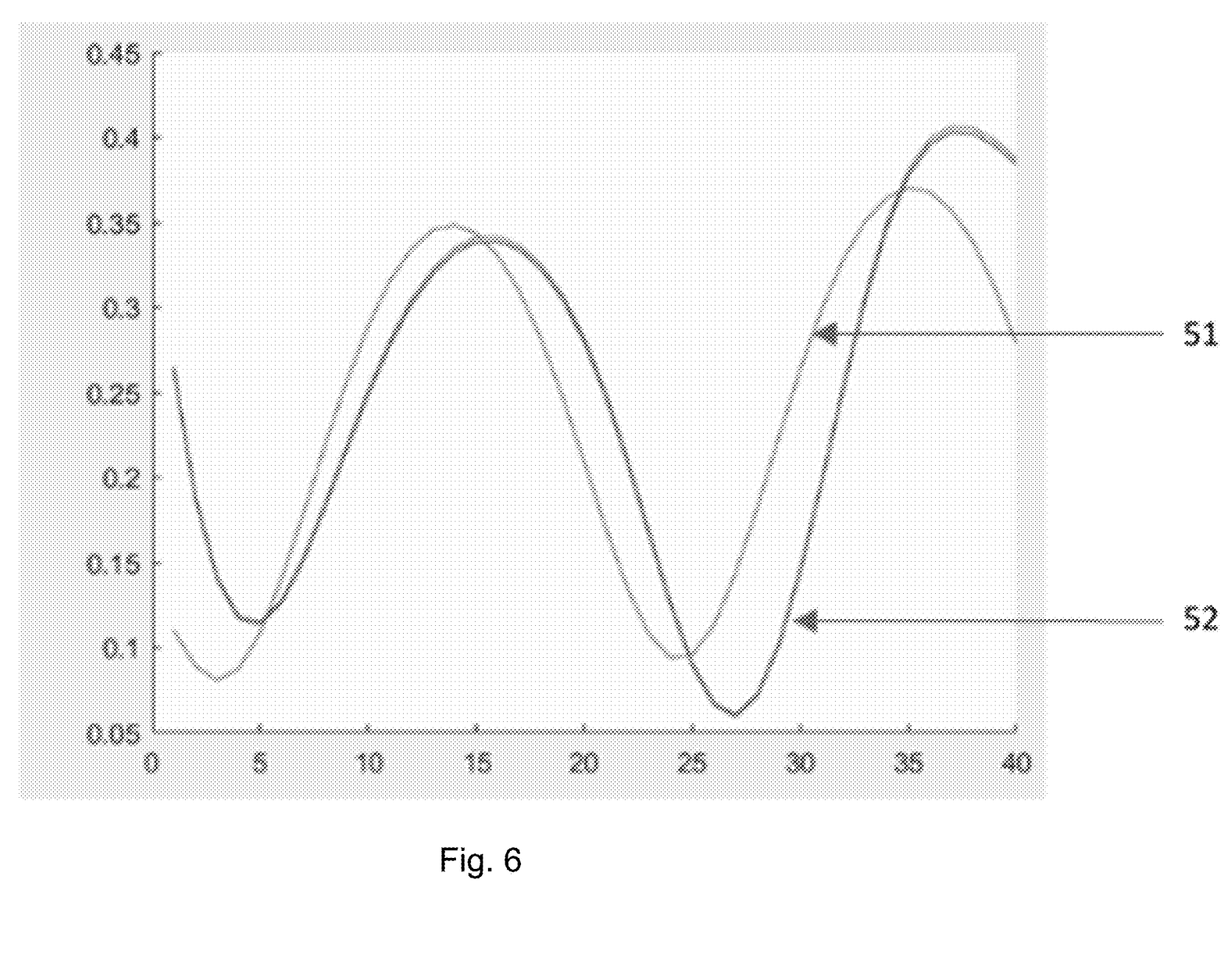
FIG. 6 is a diagrammatic representation of an embodiment example of the method in FIG. 1.

FIG. 6 shows an example theoretical spectral reflectance 51 for a layer of 1.2 µm $SiO_2$ deposited on a substrate of Si.

These theoretical spectral reflectance signals constitute the reference interferometric signals associated with the two reference classes used for the segmentation of the object, these classes corresponding to the two known types of layers or structures.

By way of example, the theoretical or reference spectral reflectance corresponding to the case of a simple transparent layer deposited on a reflective medium, as shown in FIG. 6, can be constructed mathematically, in normal incidence, using the following equation:

$$R = \frac{r_{01} + r_{12}e^{-j2\beta}}{1 + r_{01}r_{12}e^{-j2\beta}}. \quad \text{[Math. 5]}$$

Coefficients $r_{01}$ and $r_{12}$ are Fresnel reflection coefficients that are dependent on the wavelength. The coefficient $r_{01}$ corresponds to the interface between the ambient medium and the transparent material, and the coefficient $r_{12}$ to the interface between the transparent layer and the substrate.

The constant β is defined as β=2dn, where d is the thickness of the layer, and n is its refractive index which is also dependent on the wavelength.

FIG. 6 also shows a measurement of spectral reflectance 52, attributed to the reference structure corresponding to a layer of $SiO_2$ due to the fact of its closer resemblance to this reference in terms of spectral reflectance.

Figure 7:
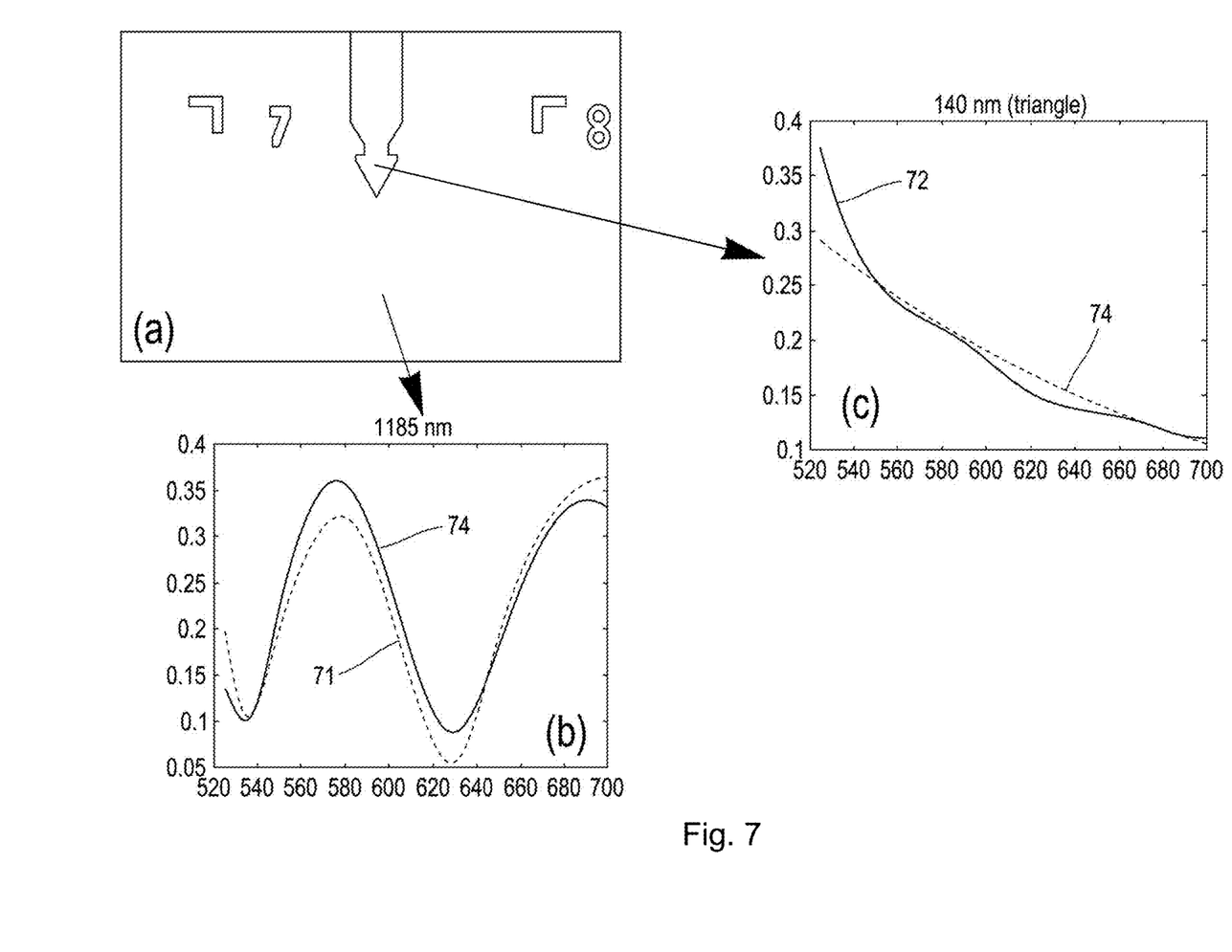
FIG. 7 is a diagrammatic representation of an embodiment example of the method in FIG. 1.

FIG. 7a shows the results of the classification, or segmentation, obtained by the step of attribution of the interferometric signals to classes of the method according to the invention. This classification results in a distribution of the pixels of the image between the two known reference structures, from an attribution of the measured interferometric signals to one of the two classes defined beforehand and corresponding to these reference structures.

Once the pixel is attributed to the corresponding reference structure class, it is possible to estimate the measurement of the thickness of silicon dioxide deposited on the layer of silicon. An adjustment of the parameters of the theoretical spectral reflectance curve (see equation Math. 1) with the measurement of reflectance of the pixel thus makes it possible to obtain an estimated value of the thickness d for each pixel measured.

FIGS. 7b and 7c show theoretical reflectances 73, 74 in correspondence with the measured reflectances 71, 72 after adjustment of the layer thickness parameter for a pixel of each of the two classes, respectively, in FIG. 7a. This thickness parameter thus gives an estimation of the thickness of the transparent layer of silicon dioxide at each pixel. For FIG. 7b, the thickness is estimated at 1.185 µm, and for FIG. 7c, the thickness is estimated at 0.140 µm, these two values being coherent with the expected shape of the object.

This measurement principle can be extended to multiple stacks of layers or complex refractive indices.

Hereinafter, two examples of implementation of the segmentation of the surface of the object will be described in greater detail: firstly, an implementation of the classification of the interferometric signals in classes based on the K-mean algorithm, and secondly, an implementation of the classification of the interferometric signals in classes based on a combination of a K-mean algorithm and a watershed algorithm on multispectral data in order to produce a preliminary segmentation and initialize the K-mean algorithm. As the K-mean algorithm is known elsewhere, it is therefore not detailed here.

Use of the K-Mean Algorithm for Classification of the Interferometric Signals

This example considers the question of defining reference spectral reflectances (or reference interferometric signals) based on an approximate prior item of information on the structures or the stacks on the surface of an object to be measured. These reference spectral reflectances form a set of predefined classes.

Figure 8:
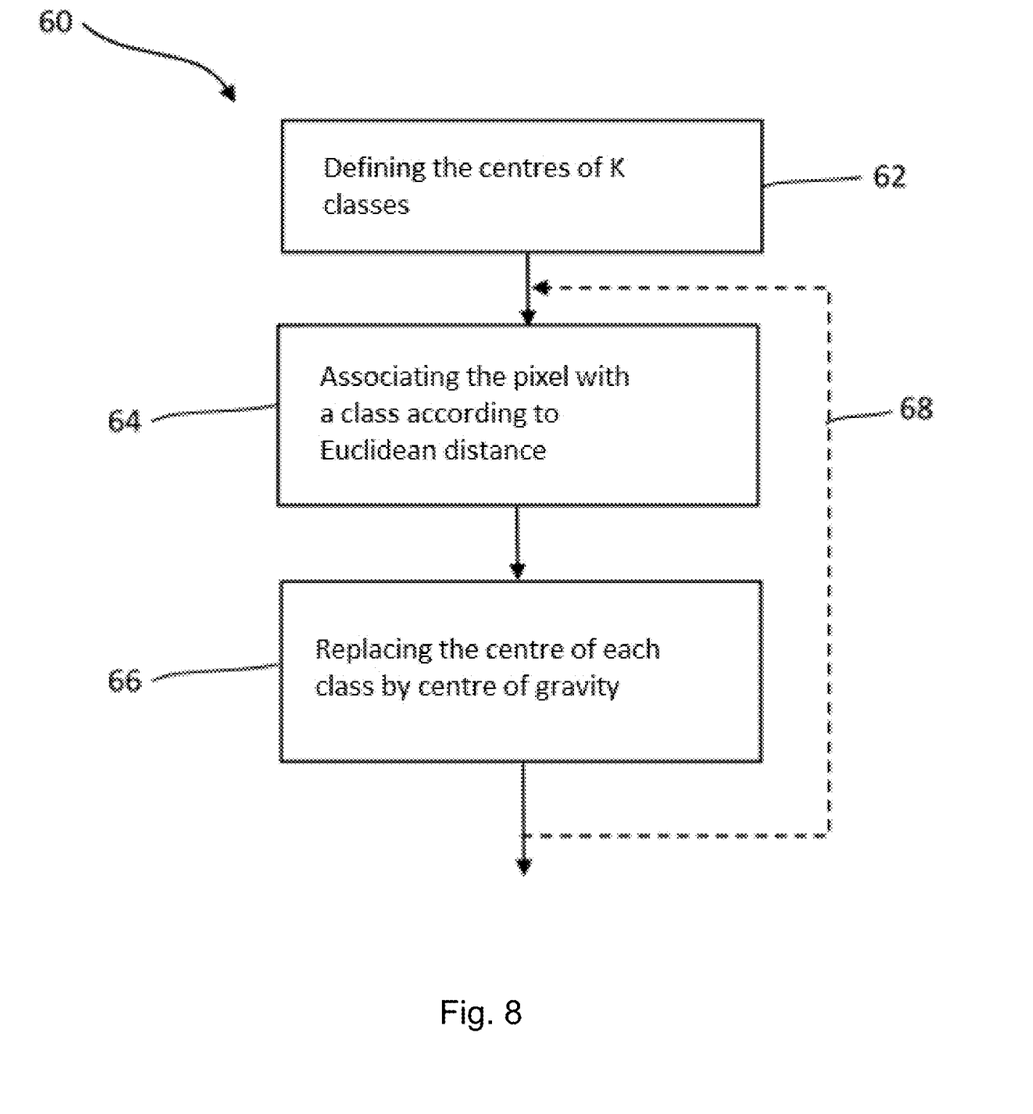
FIG. 8 is a diagrammatic representation of steps of the method according to the invention, according to a non-limitative example.

The architecture 60 of the algorithm is shown in FIG. 8.

The reference spectral reflectances can serve to initialize a K-mean algorithm by defining initial positions of the centres of classes (step 62). Then, each pixel of the field of view is assigned the class the centre of which is the closest in terms of spectral signature, by using, for example, a Euclidean distance (step 64). Then for each class, the predefined centre is replaced by the centre of gravity defined by the average spectrum of all the pixels assigned to this class (step 66). Steps 64 and 66 are iterated (arrow 68) until the centres of the classes no longer change, in the sense of a convergence criterion based, for example, on variations of reference spectral reflectances from one iteration to another, or changes of class of the pixels between two iterations.

The use of the K-mean algorithm appears particularly suitable with respect to a simple "closest near neighbour" classification directly on the reference spectral reflectances, as it allows an adaptation of these reference spectral reflectances (displacement of the centres).

According to a variant, it can be useful to adjust the reference spectral reflectances, as the composition of the stacks is not known exactly, in particular the exact thicknesses of transparent layers. In addition, the structures can present variations of thickness over the entire surface of the object. The reference spectral reflectances therefore generally cannot be exactly superimposed on the spectral reflectances of the pixels attributed to the corresponding class.

If there are areas wherein a reference spectral reflectance cannot be defined, in the case for example of the presence of under-resolved patterns or areas wherein the composition is completely unknown to the operator, it is possible, for this step of attribution of the pixels to the classes, to define a partially or completely empirical initialization. The user can, for example, designate typical pixels on a reference field of view. The spectral signatures of these typical pixels then serve to initialize the centres of classes and the algorithm executes as described above.

After convergence of the K-means with data where all the classes are represented, it is possible to use the spectral reflectances of the centres, or average spectrum of each class, to initialize the classification for any field of view on the object.

While not all the classes are necessarily represented in each field of view, not taking account thereof would lead to an over-segmentation effect of the field of view. Homogenous regions can, for example, be divided into several areas and therefore incorrectly classified; the stacks of materials would then be incorrectly identified for a large part of the pixels. It is necessary to exclude the useless classes for each shot.

Different criteria can be established for selecting the classes to be excluded:

Before convergence of the K-means, the average spectrum of the class at the first iteration can be compared with its reference spectrum. Beyond a threshold value, it is estimated that the position of the centre has diverged from its initial position, and the class is considered invalid and excluded.

Before convergence of the K-means, the number of pixels associated with each class can be considered. Below a threshold number, the class is considered as non-representative and is excluded.

After convergence of the K-means, the distance between the centres of classes can be compared 2 by 2. Below a certain threshold, only pixels corresponding to one and the same stack of materials are considered. The classes concerned are then merged.

Joint use of a preliminary segmentation algorithm: multispectral watershed algorithm As described above, for the pixel classification, in particular for the chosen K-means mode of implementation, initialization of the classes is an important step. In fact, if too large a number of classes is defined or if these classes do not correspond to the stacks actually present in the field of view, the classification result is compromised.

It is thus possible to perform a preliminary segmentation step without taking account of pre-established reflectance models and then to classify the pixels region by region. Advantageously, the results of this preliminary segmentation step can be used for selecting the classes and adjusting the reference spectra before performing a pixel-by-pixel classification on this subset of classes.

In the example shown, this preliminary segmentation is performed by using the reflectance, or the spectral reflectance originating from the interferometric signals. In fact, in many cases, as shown for example in FIG. 4, this spectral reflectance varies between the different structures or materials.

In order to perform the preliminary segmentation, a watershed algorithm is used on multispectral data as described by Li et al. in "*Multispectral image segmentation by a multichannel watershed-based approach*", International Journal of Remote Sensing, 2004, vol. 28, p. 4429-4452. This is an approach based on the contours, i.e. it is considered that the regions that are homogenous in the sense of reflectance and that it is sought to segment, are separated by multispectral gradients.

The first step of the preliminary segmentation algorithm is calculating the multispectral gradient map.

The multispectral gradient is defined as follows. The input data of the algorithm are a reflectance cube, each pixel is defined by a vector of dimension N, where N is the number of wavelengths available for describing the reflectance of this pixel. The objective is to create a gradient image in greyscale based on the multispectral data in order to then be able to apply a conventional watershed algorithm.

The second step of the preliminary segmentation algorithm is the application of the watershed algorithm to the calculated gradient map (greyscale map).

Thus a distribution of the interferometric signals into homogenous regions is obtained.

As explained above, it is then possible to determine classes based on homogenous regions. It is possible, for example, to calculate a reference interferometric signal for each region based on the interferometric signals of this region, and to use it to initialize a class. Of course, it is possible to generate classes based on interferometric signals originating from regions that are different but considered to be similar, and/or to use prior knowledge of the object in order to generate the classes.

Once these preliminary segmentation steps have been performed, pixel-by-pixel classification of the interferometric signals into classes can be carried out, in particular by using the K-mean algorithm as explained above.

Of course, the invention is not limited to the examples that have just been described, and numerous modifications may be made to these examples without exceeding the scope of the invention.

The invention claimed is:

1. A method for measuring a surface of a substrate comprising at least one structure using low coherence optical interferometry, the method being implemented with a system comprising an interferometric device, a light source, an imaging sensor, and a processing module, the method comprising the following steps:
acquiring, with the imaging sensor, an interferometric signal formed by the interferometric device between a reference beam and a measurement beam reflected by said surface at a plurality of measurement points in a field of view;
the following steps being carried out by the processing module:
distributing the acquired interferometric signals according to homogenous regions of the field of view, where the regions are homogenous according to a predefined criterion;
for at least one measurement point, identifying a class associated with a reference interferometric signal, representative of a typical structure, from the acquired interferometric signals in the homogeneous region to which the measurement point belongs;
classifying, by a learning technique, the acquired interferometric signals according to a plurality of identified classes; and
analysing the interferometric signals in order to derive therefrom information on the structure at the measurement points, as a function of the class of each interferometric signal.

2. The method according to claim 1, characterized in that the learning technique involves a neural network.

3. The method according to claim 1, characterized in that the learning technique implements learning data corresponding to the reference interferometric signals predefined theoretically or experimentally, or derived during training by accepting or rejecting some of the data.

4. The method according to claim 1, characterized in that the step of classifying the interferometric signals comprises a step of initialization of classes.

5. The method according to claim 4, characterized in that the step of initialization of classes comprises supplying at least one of the following elements:
a list of classes; and
a prior estimation of the number of classes present in the field of view.

6. The method according to claim 5, characterized in that supplying a list of classes comprises at least one of the following steps:
determining classes based on measurements of interferometric signals on a reference surface having known structures;
determining classes from prior knowledge of the structures present on the surface of the substrate;
determining classes experimentally based on measurements performed on a reference object with known structures.

7. The method according to claim 1, characterized in that the step of analysing the interferometric signals comprises an identification of a structure or of a property of a structure as a function of the class of each interferometric signal.

8. The method according to claim 1, characterized in that the step of analysing the interferometric signals comprises determining the thickness of one or more transparent layers by applying a spectral reflectance model depending on the class of each interferometric signal.

9. The method according to claim 1, characterized in that the step of analysing the interferometric signals comprises determining a height of the surface at the measurement points by taking account of a phase shift factor of each interferometric signal depending on its class.

10. The method according to claim 9, characterized in that it further comprises a step of determining a corrected profile of the substrate and/or a topology of the at least one structure on the substrate.

11. The method according to claim 1, characterized in that the acquisition step is carried out by measuring an interferometric signal for each pixel of a sensor performing a full-field measurement, where each pixel of the field of view of the sensor corresponds to a measurement point.

12. The method according to claim 1, characterized in that it is implemented with a semiconductor substrate or a transparent substrate.

13. A system for measuring using low coherence optical interferometry, for measuring a surface of a substrate comprising at least one structure, the system comprising:
an interferometric device, a light source, and an imaging sensor, for acquiring, with the imaging sensor, an interferometric signal formed by the interferometric device between a reference beam and a measurement beam reflected by said surface at a plurality of measurement points in a field of view; and
a processing module for processing acquired interferometric signals, configured in order to:
distribute the acquired interferometric signals according to homogenous regions of the field of view, where the regions are homogenous according to a predefined criterion;
for at least one measurement point, identify a class associated with a reference interferometric signal, representative of a typical structure, from the acquired interferometric signals in the homogeneous region to which the measurement point belongs;
classify, by a learning technique, the acquired interferometric signals according to a plurality of identified classes; and
carry out an analysis of the interferometric signals in order to derive therefrom an item of information on the structure at the measurement points, as a function of the class of each interferometric signal.

14. The system according to claim 13, characterized in that the interferometric device comprises a full-field interferometric sensor.

* * * * *